United States Patent [19]

Palmer

[11] 4,147,057

[45] Apr. 3, 1979

[54] WIND COMPONENT ANEMOMETER

[76] Inventor: Thomas Y. Palmer, 823 S. Ridge Dr., Fallbrook, Calif. 92028

[21] Appl. No.: 835,366

[22] Filed: Sep. 21, 1977

[51] Int. Cl.$^2$ .............................................. G01W 1/00
[52] U.S. Cl. ...................................................... 73/189
[58] Field of Search .............. 73/189, 229; 416/231 B, 416/231 R, 91, 237, 228; 244/199

[56] References Cited

U.S. PATENT DOCUMENTS

| 2,149,951 | 3/1939 | Baker | 416/231 B |
|---|---|---|---|
| 2,422,098 | 6/1947 | Heintzelman | 416/237 |
| 3,175,152 | 3/1965 | Shafer | 73/189 |
| 3,208,275 | 9/1965 | Thornthwaite et al. | 73/189 |
| 3,397,869 | 8/1968 | Webster | 416/237 |
| 3,820,918 | 6/1974 | Goldstein | 416/237 |
| 3,823,611 | 7/1974 | Rudow et al. | 73/189 |

FOREIGN PATENT DOCUMENTS

| 517689 | 5/1921 | France | 73/229 |
|---|---|---|---|
| 226177 | 5/1964 | Sweden | 73/229 |
| 452709 | 8/1936 | United Kingdom | 416/231 |
| 483681 | 4/1938 | United Kingdom | 416/231 B |

*Primary Examiner*—Anthony V. Ciarlante
*Attorney, Agent, or Firm*—Whann & McManigal

[57] ABSTRACT

An anemometer for measuring the component of air or of a similar fluid speed along its axis of rotation, in which the anemometer has a plurality of generally radially directed, helicoidal airfoils. The airfoil effect is produced by the helicoidal twisting which results in a vacuum being produced on one side thereof according to the direction of rotation. Each of the airfoils has a plurality of helicoidal edges, each edge being formed by the intersections of two or more plane surfaces so as to form airfoils having parallelogram or substantially parallelogram cross-sections. Each airfoil extends outwardly from a rotatable hub and is attached to the hub at its inner end but is spaced in part from the hub by a cutout area, such as a slot across the airfoil.

The spaces formed along the surfaces of the hub cause each airfoil to effectively perform as a true airfoil with trailing vortices produced at the airfoil tip and next to the hub as a result of the aerodynamic lift forces on the blades, whereby the blades respond accurately to the component of wind along the axis of rotation.

22 Claims, 15 Drawing Figures

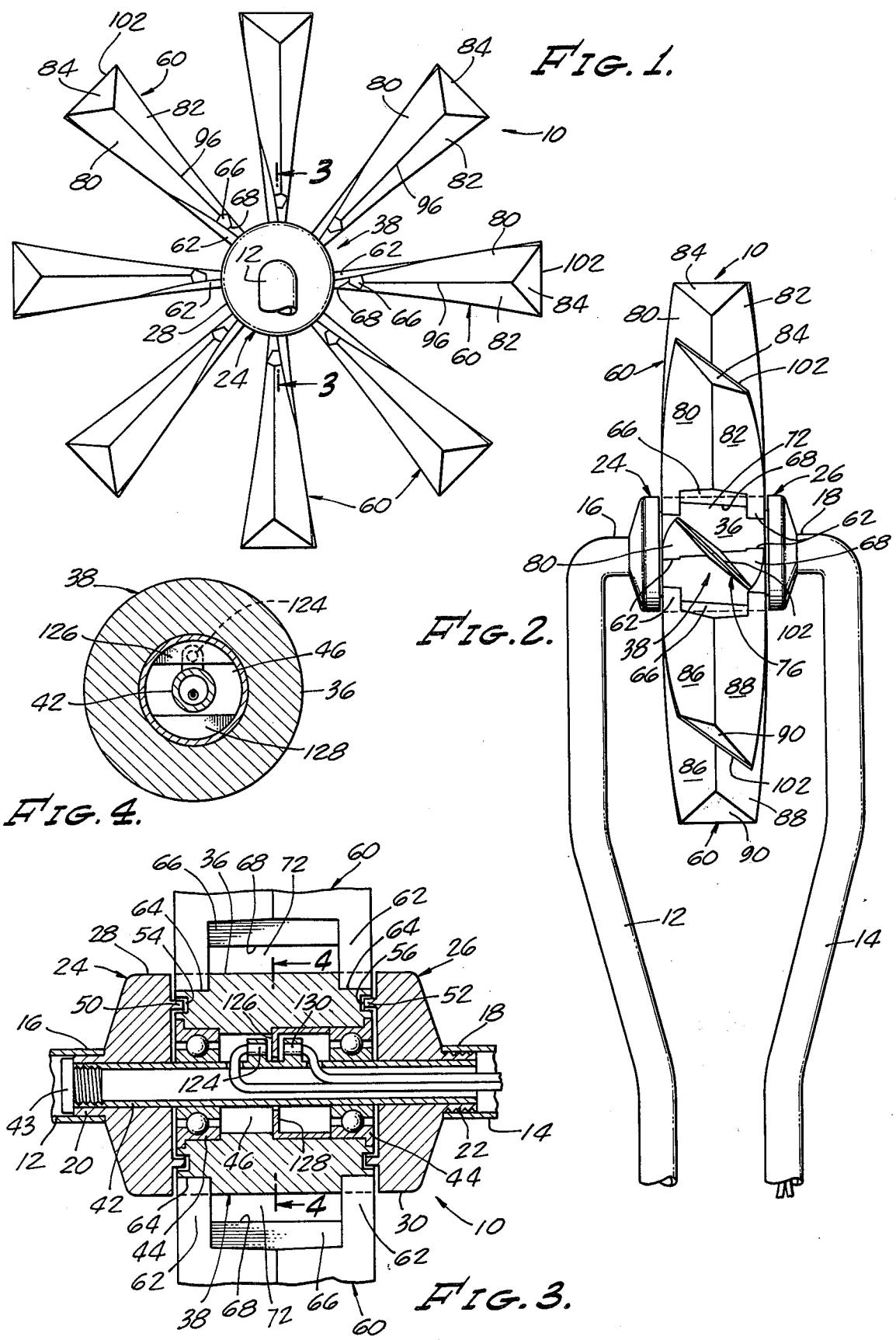

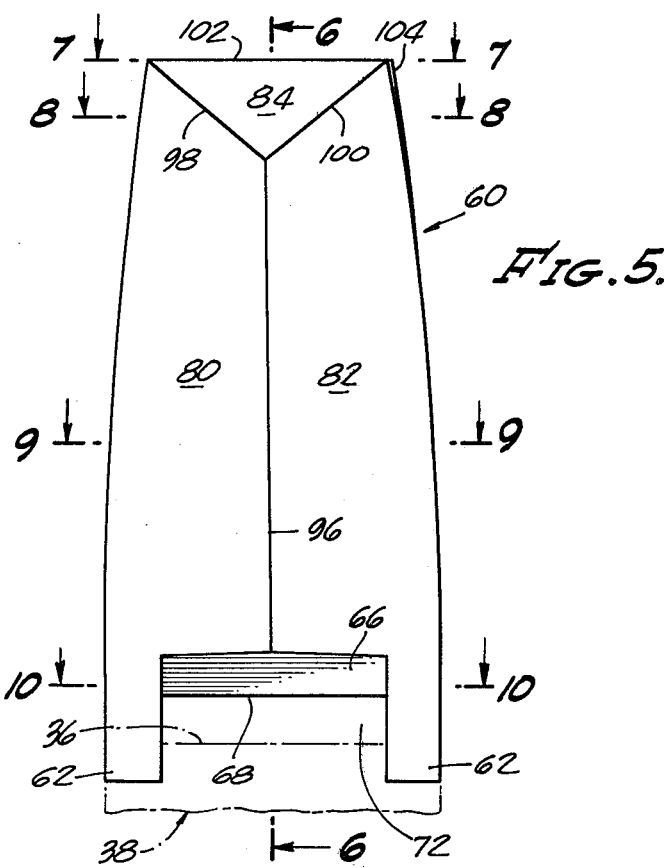
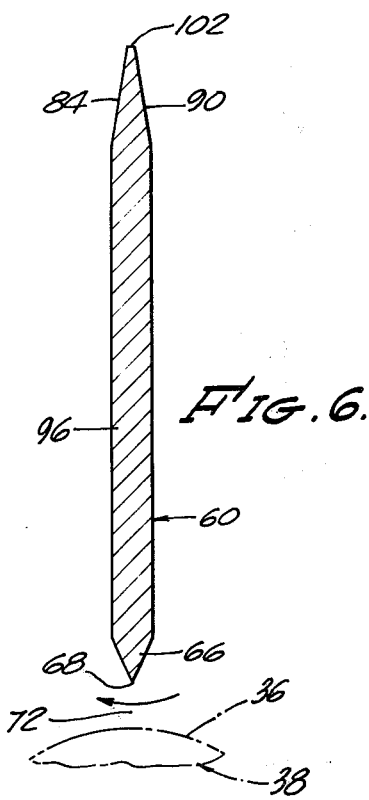
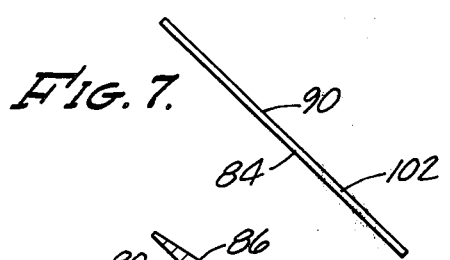
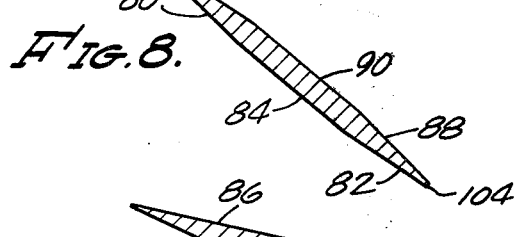
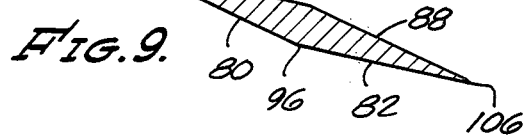
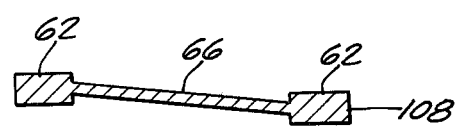
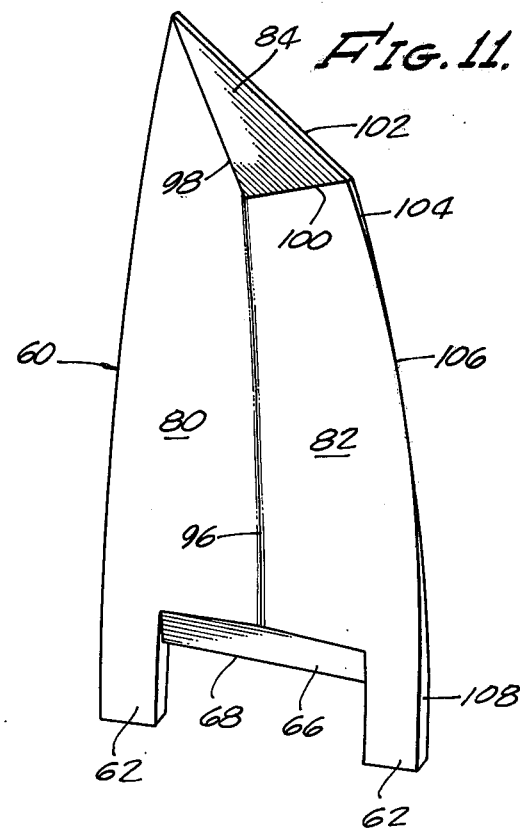

WIND COMPONENT ANEMOMETER

BACKGROUND OF THE INVENTION

The invention relates to a fixed-axis multibladed anemometer having the capacity of accurately sensing the speed component of air flow along the axis of rotation of the instrument at all angles of the incidence of the moving air.

Anemometers utilizing helicoidal blades have been in use for many years. The helicoidal shape of the blades assures a constant angle of attack all along the blades as they rotate. The helicoidal blade form has been used in previous fixed anemometers, such as those shown in the copending application filed by the inventor herein and Clifford J. Auvil, Ser. No. 680,650, filed in the U.S. Patent and Trademark Office on Apr. 27, 1976, entitled "Environmentally Resistant Anemometer".

In the prior art the mathematical derivation of these blade forms assumes that the blade is infinitely long and neglects the finite length to the tip or outer end of the blade, the hub effects and the interactions between the blades. The vortices that are generated at the blade tips and the vortices generated at the inner sections between the blades can cause significant errors in fixed axis anemometers. In a typical four-bladed anemometer having flat helicoidal blades, the error is approximately 10 to 20 percent where the angle of incidence of the wind to the fixed axis is between 60° and 90°. This error source can be so large so as to cause the instrument to rotate in a direction apparently counter to the wind direction component for odd numbers of blades at large angles of incidence, particularly for large numbers of blades (more than thirteen) and for blades designed for a 45° helicoidal twist, but set at a different angle. This occurs because of loss of aerodynamic symmetry, or a change in the portion of the anemometer blades interacting with the flow.

The errors in these fixed axis anemometers have been attributed to the von Karman vortices shed by the shaft on which the anemometer is mounted. A variety of devices, such as shaft extenders, surface roughening, and trip wires on the shaft have been applied to mitigate the errors, but these methods have failed to solve the problem. According to the present invention, it has been recognized that the source of the errors is in the vortices generated by the blades. In the application, Ser. No. 680,650, an approximately spherical hub was used to generate a dynamic pressure flow. This flow was directed with two parallel circular ridges on the surface of the hub and a rectangular channel having a centrally positioned post therein at the base of the anemometer blades was provided to cause air to flow along the blades to displace the blade tip vortices away from the ends of the blades. It was found that this structure was not reliable at all wind speeds, directions of wind change, and angles of incidence because of the small eddies of atmospheric turbulence which induces instabilities in the flow over the spheroidal or ellipsoidal hubs and in the flow over the flat blades. The instability occurs because a sphere and ellipsoid are three dimensional aerodynamical bodies which have separation points and flow irregularities occur even under conditions of low turbulence and constant air flow, said instabilities propagate into the air flow over the flat-plate blades.

Flow separation over flat plates is very sensitive to the level of turbulence in the flow, and the angle of attack of flat blades to the flow. Changes of 1° in the blade set angle in flat plate anemometers cause 10 to 20% errors at critical angles. This makes the instrument sensitive to turbulent flows.

SUMMARY OF THE INVENTION

The present invention provides helicoidal airfoils having an angular twist between the axis of the hub and the airfoils, and a multiple of faces which intersect to form a plurality of helicoidal edges. The total amount of the twist may vary from 20° to 70°, but the most efficient angle of twist in terms of material and of dynamic forces is 45°.

The airfoils are secured to a cylindrical hub and spaces for slots are formed along chamfered base edges of the airfoils at the circumference of the hub so that each airfoil is effective as a true airfoil. In general the slot or space formed at the chamfered base of the airfoil between the airfoil edge and the circumference of the hub need not be of symmetrical or of regular cross-section. The slot should either extend to the edges of the airfoil or the airfoil edge should be very thin at the hub so that a strong vortex is formed in the slot or space between the hub and the chamfered inner end of the airfoils.

This new concept utilizes the generation of a pair of vortices by the air flow over each rotating helicoidal airfoil. This vortex pair is one-half the usual size generated in prior art blading, and this flow along the blading has a net zero vorticity over the span one airfoil. The result of this reduction in the size of the vortices reduces, deflects, or eliminates the interaction of the vortices generated by any given anemometer airfoil with the other anemometer airfoils of the instrument, because the vortex caused torques are generated over the length of one airfoil rather than across the whole instrument.

In usual meterological conditions, when the three components of wind velocity are desired, the superior accuracy of the present invention eliminates the need of complex and costly computer computations and approximation to determine the correct wind speeds.

The present invention, for example, provides accurate measurement of air speed in applications, such as in hang-gliders, at all angles of attack so as to provide warning of stalling, and of high speed side-slip flight which can lead to loss of control.

Accordingly, it is an object of the present invention to provide an improved anemometer which eliminates the errors associated with anemometers caused in the blades which result in inaccurate measurement of air flow speeds.

It is another object of the invention to provide an improved rotation sensing system in which a light emitting diode (LED) is used. The system reduces the power consumption of the LED light signal generation, typically by a factor of 10.

It is still another object of the invention to provide an improved rotation sensing system that increases the precision accuracy and measurement of the anemometer rotation rate and wind speed. This is accomplished by measurement of only portions of angles of rotation rather than multiples of rotations.

A further object of the invention is to provide an improved rotation sensing system which produces a linear output.

It is a still further object of the invention to provide an improved anemometer which has an enlarged cylindrical hub. Previous designs have attempted to reduce or eliminate the effect of the mounting shaft by making it as small as possible. This invention takes advantage of the effect of a mounting shaft to increase the accuracy of angular response by separating the vortices produced at the hub and intensifying them so that they balance and thereby negate the effect of the vortices produced by the airfoil tips. It has been found that this requires that the ratio of the hub diameter to the anemometer diameter be greater than 1 to 5. In a preferred embodiment of the invention a ratio of 1 to 4.75 is used to insure aerodynamic stability and yet maintain the angular movement of materials to reduce inertial forces thereby improving the instrument response to changes in air speed.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is a side elevational view of an anemometer assembly according to the invention;

FIG. 2 is a front elevational view of the anemometer shown in FIG. 1;

FIG. 3 is a fragmentary view of the anemometer, illustrating the hub in cross-section and the rotation sensing system within the hub, taken along the lines 3—3 in FIG. 1;

FIG. 4 is a cross-sectional view of the hub, taken along the lines 4—4 in FIG. 3;

FIG. 5 is an elevational view of an anemometer airfoil;

FIG. 6 is a cross-sectional view of an anemometer airfoil, taken along the lines 6—6 in FIG. 5;

FIG. 7 is a view of the top edge of the airfoil, taken along the lines 7—7 in FIG. 5;

FIG. 8 is a cross-sectional view of a portion of the airfoil, taken along the lines 8—8 in FIG. 5;

FIG. 9 is a cross-sectional view of a central portion of the airfoil, taken along the lines 9—9 in FIG. 5;

FIG. 10 is a cross-sectional view adjacent the lower end of the airfoil, taken along the lines 10—10 in FIG. 5;

FIG. 11 is a perspective view of the airfoil shown in FIG. 5;

DESCRIPTION OF THE PREFERRED EMBODIMENTS

Figure 12:
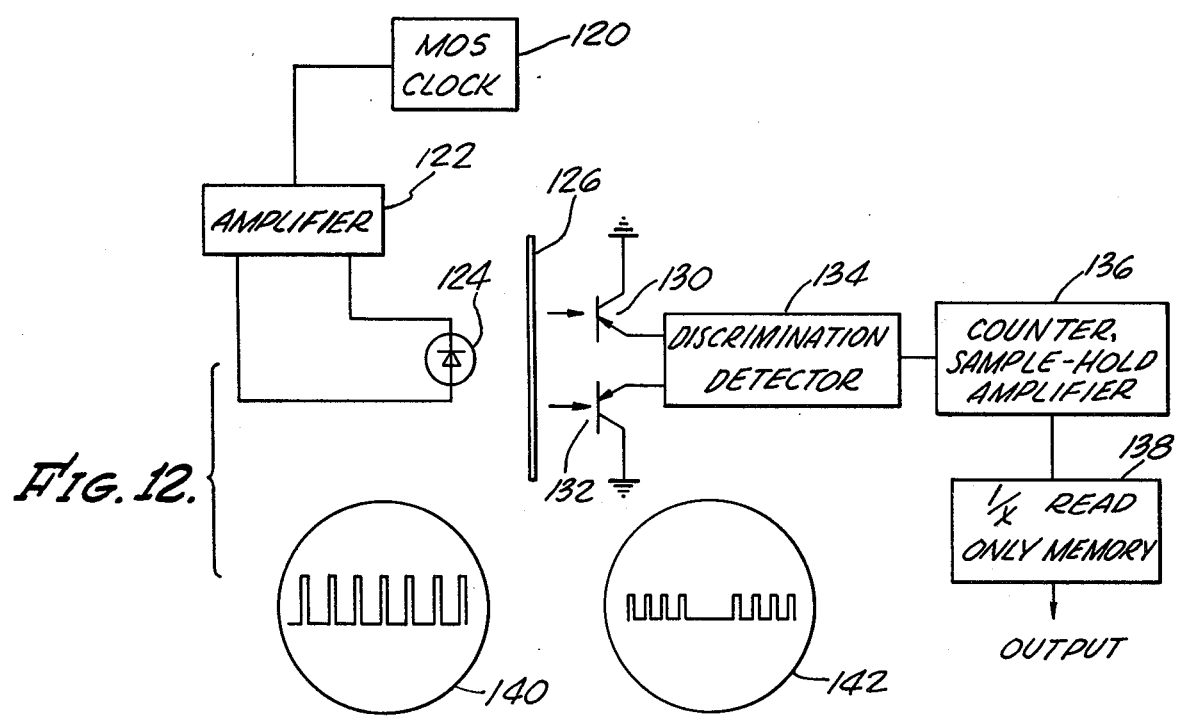
FIG. 12 is a diagrammatical view of the rotation sensing system.

Referring again to the drawings, there is shown in FIGS. 1-4 an anemometer, generally designated as 10, mounted on hollow support tubes 12 and 14. The support tubes at their inner ends 16 and 18 are in supportive engagement with outer cylindrical ends 20 and 22 of hub end caps 24 and 26, respectively. The inner portions of the end caps have cylindrical surfaces 28 and 30, which are in cylindrical alignment with outer cylindrical surface 36 of the anemometer hub, generally designated as 38.

The hub, FIG. 3, is mounted on bearings 44 for rotation on a cylindrical axle 42 fixed in the end caps 24 and 26. The outer cylindrical end 22 is threaded externally and the inner axle at end 20 is threaded internally to receive a holding screw 43 so that the hub can be mounted on a shaft instead of the tubes 12 and 14. This modification permits mounting the hub on a shaft in a hang-glider, for example.

The hub has an internal generally annular space 46 containing the rotation sensing system to be described. The inner faces of the end caps 24 and 26 have annular flanges 50 and 52 extending inwardly into complementary annular grooves 54 and 56, respectively, in the outer faces of the hub.

The anemometer has eight identical multi-faced, helicoidal airfoils, generally designated as 60, each airfoil having a multiple of helicoidal edges. This structure provides effective airfoils because their twist causes a partial vacuum to develop on one side during rotation. At the lower or inner ends of the airfoils, FIGS. 2, 3 and 5, there are lateral posts 62 spaced apart in the axial direction, and secured in complementary, evenly spaced openings 64 in the cylindrical hub surface 36. Extending between the posts are beveled inner ends 66 on the airfoils which terminate in transverse inner airfoil edges 68 spaced radially outwardly from the hub surface. Between the edges 68, the hub surface and the inner edges of the laterally spaced posts are formed generally rectangular slots 72. These transversely extending spaces need not be of symmetrical configuration but the airfoil edges 68 must be thin to produce a strong vortex.

The spaces extending across the airfoils, as 72, need not be of slot form and can be open at the ends, formed by a central support, for example, connecting the airfoils to the hub. The space or slot distance between the hub and airfoils is relatively narrow as 1/16" or ⅛". All that is required is to provide space to separate the airfoils and hub.

Extending outwardly from the posts and the edge 68, as may be best seen in FIG. 2 illustrating an airfoil 76, the airfoil is twisted spirally. As shown in FIGS. 1, 2 and 5-11, each airfoil has plane surfaces 80, 82 and 84 on one side, and respective equivalent surfaces 86, 88 and 90 on the other side, FIG. 2. The surfaces 80 and 82 intersect in a generally radially extending helicoidal line edge 96. The surfaces 80 and 82 also intersect with the triangular surface 84 to form helicoidal line edges 98 and 100, respectively. The surfaces 84 and 90 intersect with outer tip or end surfaces 102 of respective airfoils. Surfaces 82 and 88 intersect with helicoidal edge 104 which as it extends downwardly on the airfoil becomes a line edge 106, FIG. 11, and as it further extends downwardly on the posts becomes a flat edge 108. Identical edge surfaces are formed on respective other parts of the airfoils.

All of the intersecting surfaces of the airfoils form sharp edges. The facing surfaces of adjacent airfoils, such as surfaces 80, 82 and 84 and 86, 88 and 90, are at angles with each adjacent surface of from 166° to 173° to insure that the air flow on the surfaces does not separate therefrom, and so as to produce the Couanda effect.

In the embodiment shown, the airfoils are 1.125" wide and 2.250" long externally of the hub. The diameter of the hub is 1.2", making the total diameter of the anemometer 5.700". The slot 72 is 0.15" in the radial direction and 0.75" in the axial direction. The post depth into the hub is 0.1875", and diagonals in the parallelogram, as shown in FIG. 9, are 1.125"×0.125". The slot 72 can be changed in shape to accommodate varying airfoil shapes for distributing the vorticity flow to the tips of the blades in such a manner so as to counter the vorticity in the tip effects on the airfoils. The airfoils have been made from plastic, such as polycarbonate, polyvinyl chloride and glass-filled nylon.

The rotation sensing system is shown in FIGS. 3, 4 and 12, and is adapted to sense the time for one-half of a revolution of the anemometer rather than count the number of revolutions for a specific period of time. The system is comprised of a metal oxide semiconductor (MOS) clock 120, driving an amplifier 122 of sufficient power to supply a light emitting diode (LED) 124, the latter being positioned, FIG. 3, on the non-rotating axle 42 in the space 46 within the hub. Two element-shaped shutters 126 and 128 are integral with the hub so as to rotate therewith and are positioned adjacent the LED and two closely spaced photo-sensing transistors 130 and 132 so as to rotate therebetween and shut off the light from the LED to the transistors, the light signal being received by the transistors when the shutters are rotated out of alignment from the LED and the transistors. The photo-sensing transistors are connected to a discriminator detector 134 to indicate the direction of rotation and its output to a counter sample-hold amplifier 136. The output therefrom is directed to a 1/X (reciprocal) read only memory (ROM) 138 in which a comparative scan determines the wind speed.

This system produces a high frequency (approximately at a rate of 1 megahertz) series of narrow light pulses in square wave form 140, FIG. 12, interrupted by the rotation of the instrument shutters 126 and 128. The two photo-sensing transistors detect the rotation of the anemometer according to which is turned off first. This detection is determined in the discrimination detector. The shutting off of the light by the shutters changes the wave form to a chopped wave form 142 in a series of pulses which are counted and held in the sample-hold register 136 whose output is directed to the reciprocal 1/X ROM, where the slower the speed of rotation of the instrument provides the greater number of counts per sample. Because the instrument is linear in wind speed, the reciprocal of the count per sample is directly proportional to the wind speed. The output of the ROM can be recorded on magnetic tape, displayed on liquid crystal or LED displays, or on a meter. This system provides the advantages of significantly reducing the power consumption of the LED light signal generation, typically by a factor of 10, increases the accuracy and resolution of the measurement of the anemometer rotation rate, and consequently the speed, because it measures portions of angles of rotation rather than multiples of rotations, produces a linear output, and updates the measurement every one-half rotation.

Figure 13:
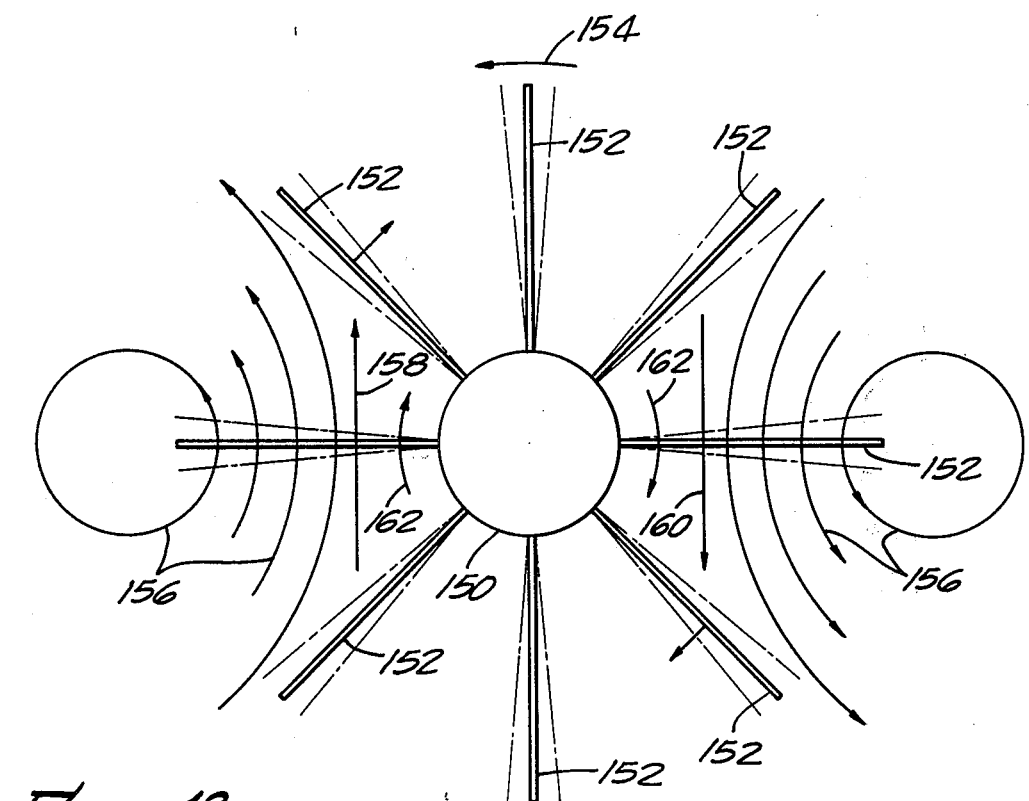
FIG. 13 is a schematic view of a prior art anemometer illustrating the vortices and resultant forces developed between the blading.

In FIG. 13 the anemometer according to the prior art is shown. Here the anemometer has a hub 150 and light blades 152 extending therefrom are equally spaced. The blades are flat but twisted, the twist not being shown. Further, there is no space between the inner ends of the blades and the hub. Direction of rotation is shown by the arrow 154. Between each pair of blades a vortex 156 is developed and on the left side the vortex 156 produces a resultant force 158 and on the right side the vortex produces a resultant force 160, in the opposite direction as indicated by the arrow. The result of this is development of forces which tend to rotate the hub in the direction of the forces 162. These forces 162, acting in the direction opposite to rotation, cause considerable inaccuracy in measuring the component of the wind on the anemometer.

Figure 14:
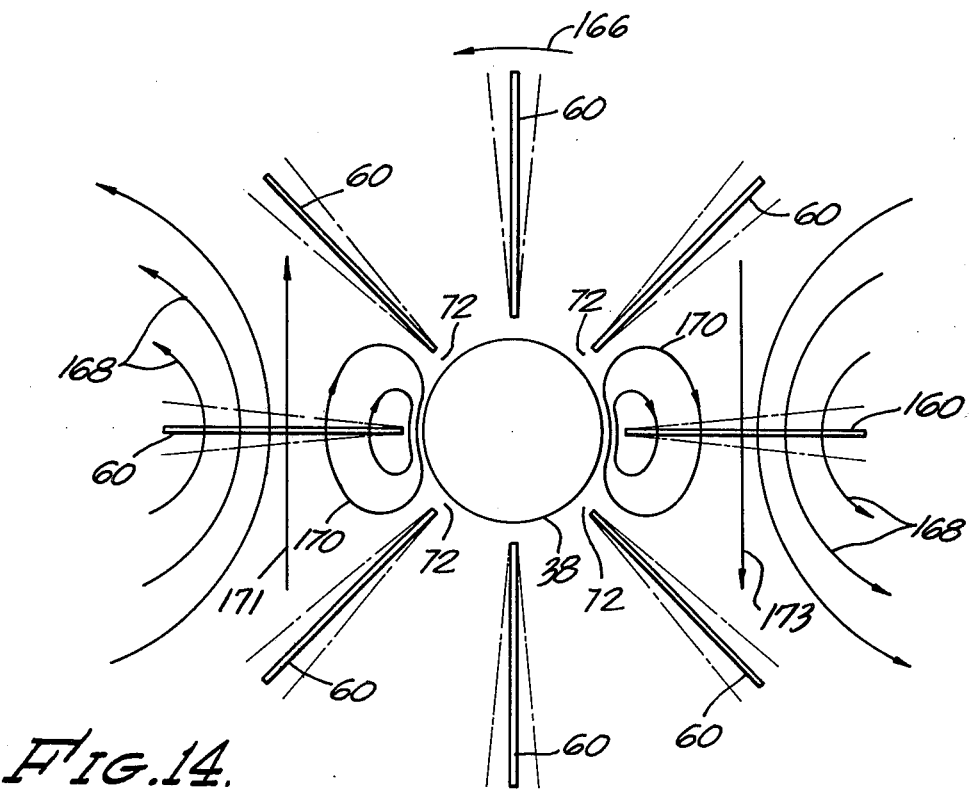
FIG. 14 is a schematic view of an anemometer according to the present invention, illustrating the formation of vortices between adjacent airfoils at their outer ends and at their inner ends.

In FIG. 14 an anemometer according to the invention having a hub 38 and airfoils 60 is shown schematically to be rotating in the direction of the arrow 166. Here the airfoils are shown without illustrating the twist. A vortex 168 is formed at the outer end of the airfoils, and the slots 72 extending transversely across the airfoils produce a vortex 170 at the inner ends of the airfoils. In FIG. 13 the vortices 156 and the forces 162 are rotating generally in the same direction whereas in FIG. 14 the vortices 168 and 170 are rotating in opposite directions. The result is that the forces 171 and 173 between neighboring airfoils are reduced because of the strengthened vortices through the slots and the alteration of the flow pattern over the hub. That is, the opposing forces as 162 in FIG. 13 are not developed to any extent. This provides for greater efficiency and accuracy.

Figure 15:
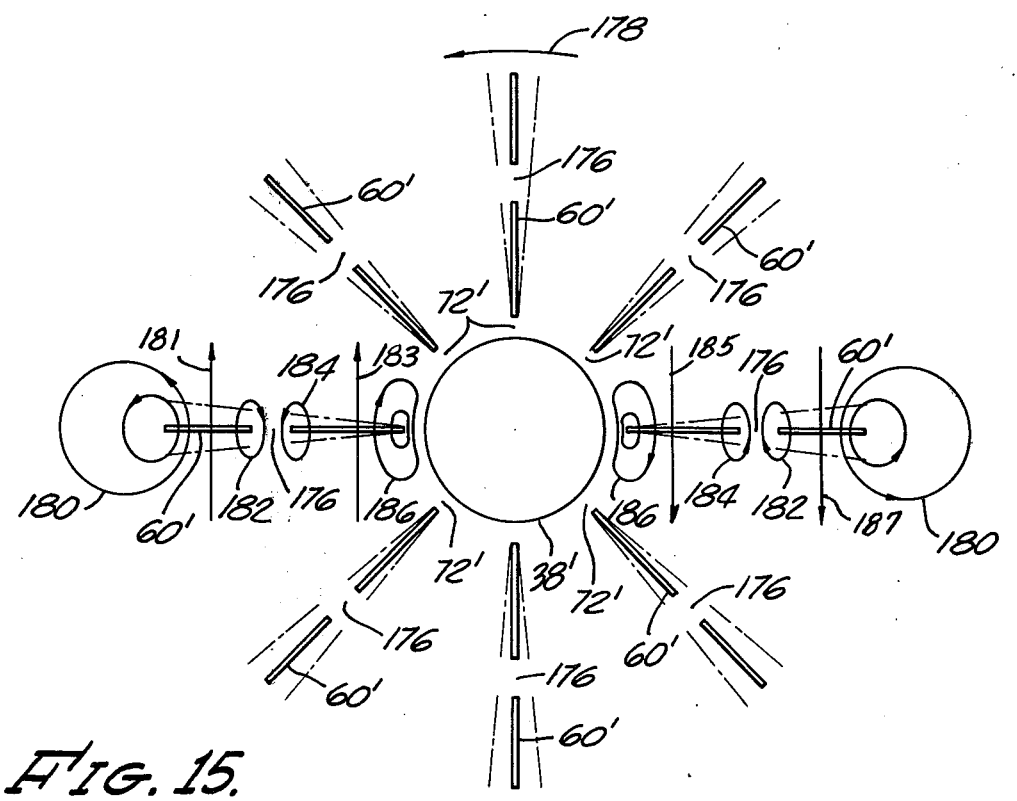
FIG. 15 is a schematic view of another embodiment of the invention in which the airfoils have cut-out portions between the blades and the hub and have additional cut-out portions within the blades outwardly of the hub.

In FIG. 15 another embodiment of the invention is shown schematically. Here a rotor 38' has eight airfoils 60' with cut-out spaces or slots 72' shown extending across the airfoils and between them and the hub. In addition the airfoils have cut-out areas 176 which are intermediate the two ends of the airfoils. Again, these cut-out areas may be of substantially any shape, such as slots across the airfoils in the manner of the spaces 72, but can extend along edges of the airfoils, the airfoils being connected inwardly of the spaces in the latter arrangement. The radial edges of the cut-outs should be sharp so as to produce strong vortices.

The direction of rotation is indicated by the arrow 178. Here between neighboring blades four vortices 180, 182, 184 and 186 are formed. Vortices 180 and 182 rotate in opposite directions and similarly the vortices 184 and 186 rotate in opposite directions. The additional cut-outs further reduce the interaction as indicated by the resultant forces 181,183 and 185,187 between the neighboring or adjacent airfoils to increase the efficiency and accuracy of the anemometer.

One of the important features of the invention is the large cylindrical hub which with the slots and cut-out portions generate vortices indicated in FIGS. 14 and 15. Vorticity from these vortices is proportional to the component of the wind along the axis which impacts on the instrument and causes the rotation.

The anemometer is free running, retarded only by the drag of the bearings and thus there is little drag or lift on the airfoils when the wind is along the axis of the instrument. As the angle of incidence of the wind increases, the drag and lift in the flow over the airfoils increases, as does the strength of the airfoil tip vortices 168 in FIG. 14 and 180 in FIG. 15. These are facts which can cause large errors in the prior art designs. Here, the vorticity generated by the flow through the slots between the hub and the chamfered airfoils is oppositely directed to that generated by the aerodynamically generated tip vortices. The surprising result is that the tip vortices are neutralized and deflected so as to permit the anemometer to respond to the air flow defined by the helicoidal airfoil edges.

The relative strength of the vortices around the edges of the airfoils are of the same strength no matter how strong the wind and no matter how fast the anemometer is rotated at any given angle of attack. Therefore, the aerodynamic corrections caused by the vortices 170 in FIG. 14 and 182, 184 and 186 in FIG. 15, are effective at all speeds because they are always of the same proportional strength.

The shape of the slot 72 can be changed to accommodate varying airfoil shapes to generate vorticity containing flow so as to counter the vorticity induced in the blade tips.

The concept of the large cylindrical hub and the airfoils in contrast to the elliptical or spheroidal hubs and flat blades in the prior art provides a substantial improvement in accuracy over the whole range of Reynolds numbers from 0 to $10^{12}$. The airfoil and generally parallelogram shape in the cross-section also improves the accuracy of the instrument in response to changes in wind, particularly to wind direction reversals and complete cessation.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims, wherein various portions have been separated for clarity of reading and not for emphasis.

I claim:

1. An anemometer for measuring the component of air or similar fluid speed along its axis of rotation, comprising:
   (a) a rotatable hub;
   (b) a plurality of helicoidal airfoils extending outwardly from said hub, each having a plurality of helicoidal edges, said edges being sharp and formed by the intersections of two or more substantially plane surfaces; and
   (c) relatively narrow cutouts formed in each of said airfoils adjacent the hub ends of said airfoils, the cutouts being generally axially disposed and positioned along the peripheral surface of said hub so that the component of air flow across the rotating hub and through the cutouts generates vorticity directed along the blades so as to neutralize the vorticity produced by the aerodynamic lift forces on the blades, whereby the airfoils respond to the component of wind along the axis of rotation.

2. The invention according to claim 1, in which said hub is cylindrical and in which said airfoils have inwardly extending connection means for joining the airfoils to the hub, said cutouts being adjacent said connection means.

3. The invention according to claim 2, in which the ratio of the anemometer diameter to the hub diameter is in the range of about 5 to 1.

4. The invention according to claim 3, in which the vorticity generated is proportional to the component of wind along the axis of rotation which impacts on the airfoils to cause the rotation.

5. The invention according to claim 3, in which the vorticity generated by the flow over the hub and through the cutouts is proportionally guided along the anemometer airfoils to their outer ends, whereby this vorticity is oppositely directed to that aerodynamically generated over the inner airfoil edges and outer airfoil ends, so that the inner airfoil edge vortices and outer airfoil end vortices are neutralized or deflected so as to permit the anemometer to respond to the air flow in the manner defined by helicoidal spiral in the airfoil edges, and so as to reduce or eliminate interactions between airfoils.

6. The invention according to claim 1, in which
   (a) each airfoil is attached to the hub at its inner end by spaced posts at opposite lateral edges of the airfoil, said posts being spaced in the axial direction; and
   (b) said cutouts being formed between the posts and along the peripheral surface of the hub.

7. The invention according to claim 6, in which the hub is cylindrical and said cutouts are in the form of slots elongated in the axial direction of the hub.

8. The invention according to claim 7, in which the airfoil portions terminating in the outer portions of the cutouts taper downwardly to the outer cutout edge.

9. The invention according to claim 1, in which the airfoils are formed of a multiplicity of surfaces intersecting at angles so as to effect flow on the airfoils in accordance with the Couanda principle.

10. The invention according to claim 9, in which the facing surfaces of adjacent blades of the main body of the blades are at angles with each adjacent surface of from 166° to 173°.

11. The invention according to claim 1, in which the outer edges of the airfoils are right angle parallelograms in cross-section, the intermediate portions of the airfoils being non-right angle parallelograms in cross-section, and the outer portions of each airfoil contiguous with the outer edge having downwardly and generally axially extending triangular faces on both sides thereof.

12. The invention according to claim 1, including a rotation sensor system that senses the time for one-half rotation of the anemometer.

13. The invention according to claim 12, in which the sensor system comprises:
   (a) an LED fixed within the hub;
   (b) a pair of transversely aligned, spaced instrument shutters rotatably mounted within the hub across the axis of rotation;
   (c) said shutters being adjacent said LED and adapted to interrupt signals therefrom as the shutters rotate thereby;
   (d) a pair of closely spaced photosensitive transistors fixed within the hub in axial alignment with the LED, the shutters being adapted to rotate between the LED and the transistors interrupting signals from the LED to the transistors;
   (e) a discriminator connected to the transistors, being adapted to detect the direction of rotation from the transistor shutoff first by a shutter;
   (f) the LED emitting a square wave form which by the interruption of the shutters becomes a chopped wave form comprising a series of pulses; and
   (g) means to count and hold the pulses and producing an output, said output being directed to a memory device adapted to produce a count directly proportional to the wind speed.

14. The invention according to claim 13, including an MOS clock to drive an amplifier of sufficient power to power the LED.

15. The invention according to claim 13, in which said means to count is a counter sample-hold amplifier.

16. The invention according to claim 13, in which said memory device is a 1/X ROM.

17. The invention according to claim 16, in which the output from the ROM can be recorded on readout means.

18. The invention according to claim 1, in which there are cutouts in the airfoils between the cutouts adjacent the hub and the outer ends of the airfoils to generate additional vortices between adjacent airfoils to further reduce the interaction therebetween.

19. The invention according to claim 18, in which: said cutouts are all slot-shaped, extending generally transversely across the airfoils, and having at least one radially directed sharp edge.

20. The invention according to claim 18, in which: said cutouts extend generally transversely across the airfoils.

21. The invention according to claim 20, in which:
(a) some of said cutouts in each airfoil extend along the edges of the airfoils and transversely inwardly thereof;
(b) said cutouts having sharp radially directed edges so as to produce strong vortices.

22. The invention according to claim 21, in which: said cutouts have radially extending widths of between approximately 1/16th inch and ⅛ inch.

* * * * *